(12) United States Patent
Bowyer et al.

(10) Patent No.: US 6,600,515 B2
(45) Date of Patent: *Jul. 29, 2003

(54) PULSED LEAKAGE TAGGING SIGNAL

(75) Inventors: Andrew E. Bowyer, Indianapolis, IN (US); Pingnan Shi, Indianapolis, IN (US)

(73) Assignee: Wavetek Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/046,449

(22) Filed: Oct. 22, 2001

(65) Prior Publication Data

US 2002/0060735 A1 May 23, 2002

Related U.S. Application Data

(63) Continuation of application No. 08/943,652, filed on Oct. 3, 1997, now Pat. No. 6,307,593.

(51) Int. Cl.$^7$ .......................... H04N 7/00; H04N 7/087; H04N 17/02; H04N 7/173
(52) U.S. Cl. ...................... 348/461; 348/476; 348/478; 348/479; 348/477; 348/192; 348/193; 725/107
(58) Field of Search .................... 348/461, 476, 348/477, 478, 479, 192, 193; 455/67.1, 67.3, 67.4, 47, 115; 725/9, 107

(56) References Cited

U.S. PATENT DOCUMENTS

| | | | |
|---|---|---|---|
| 4,072,899 A | * | 2/1978 | Shimp ........................ 725/143 |
| 4,471,380 A | * | 9/1984 | Mobley ...................... 380/226 |
| 4,907,269 A | | 3/1990 | Guillon et al. |
| 5,070,404 A | | 12/1991 | Bullock et al. |
| 5,103,310 A | | 4/1992 | Gibson et al. |
| 5,294,937 A | * | 3/1994 | Ostteen et al. .............. 342/459 |
| 5,321,849 A | * | 6/1994 | Lemson ...................... 455/67.1 |
| 5,373,241 A | * | 12/1994 | Ham, Jr. et al. ............. 324/536 |
| 5,402,177 A | * | 3/1995 | Maeshima et al. .......... 348/476 |
| 5,465,112 A | * | 11/1995 | Nakao ............................. 725/9 |
| 5,633,582 A | * | 5/1997 | Orndorff et al. .............. 324/95 |
| 5,651,065 A | * | 7/1997 | Stufflet et al. .............. 380/213 |
| 5,982,165 A | * | 11/1999 | Bowyer et al. ............... 324/95 |
| 6,018,358 A | * | 1/2000 | Bush .......................... 725/125 |
| 6,118,975 A | * | 9/2000 | Bowyer et al. ............. 725/107 |
| 6,215,514 B1 | * | 4/2001 | Harris ......................... 725/74 |
| 6,307,593 B1 | | 10/2001 | Bowyer et al. |

* cited by examiner

*Primary Examiner*—John Miller
*Assistant Examiner*—Paulos Natnael
(74) *Attorney, Agent, or Firm*—Maginot, Moore & Bowman

(57) ABSTRACT

A method of transmitting a leakage tagging signal includes inserting a tagging signal into a CATV television signal only during portions of the television signal in which control information is present. A method according to the present invention is a method of transmitting a tagging signal in a communication system, the communication system transmitting television signals comprising control information and program information. One step of the method includes generating a tagging signal that is detectable by corresponding leakage detecting equipment. The method also includes the step of identifying a portion of a television signal in which control information is present. Finally, the method of the present invention encompasses inserting the tagging signal into the television signal only during the portion of the television signal in which control information is present.

23 Claims, 5 Drawing Sheets

PULSED LEAKAGE TAGGING SIGNAL

CROSS-REFERENCE TO RELATED APPLICATIONS

This is a continuation under 35 U.S.C. §120 of U.S. patent application Ser. No. 08/943,652, filed Oct. 3, 1997 now U.S. Pat. No. 6,307,593.

FIELD OF THE INVENTION

The present invention relates generally to the field of cable television (CATV) transmission system testing, and in particular, to leakage testing in CATV transmission systems.

BACKGROUND OF THE INVENTION

Cable television systems, or CATV systems, are used in a widespread manner for the transmission and distribution of television signals to end users, or subscribers. In general, CATV systems comprise a transmission subsystem and a distribution subsystem. The transmission subsystem obtains television signals associated with a plurality of CATV channels and generates a broadband CATV signal therefrom. The distribution subsystem then delivers the CATV broadband signal to television receivers located within the residences and business establishments of subscribers.

One problem facing CATV service providers is signal leakage. Signal leakage refers to the transmission and/or reception of signals through breaches or other nonconformities in the CATV distribution subsystem. In particular, the distribution subsystem, which typically comprises coaxial cable, amplifiers and other devices, ideally provides a relatively low-loss conduit between the CATV transmission subsystem and subscribers' television receivers. If, however, portions of the distribution subsystem are physically damaged, for example, the coaxial cable is damaged, kinked or broken, then CATV signals may leak through the damaged portions, causing unwanted transmission into the atmosphere.

The primary problem associated with the transmission of the CATV signal into the atmosphere via leakage is potential interference with aeronautical communications. Portions of the allocated CATV bandwidth overlap with frequencies allocated for aeronautical communication. Excessive leakage of CATV signals can therefore undesirably interfere with aeronautical-related signal transmission and reception.

Another problem caused by excessive leakage arises in the context of reverse path communication. Reverse path communication refers to communication signals generated by CATV subscribers and transmitted to the CATV transmission subsystem. The problem caused by leakage is that signal ingress due to leakage can undesirably interfere with such reverse path communications. Signal ingress is the infiltration of spurious external signals into the CATV distribution subsystem. If there are several leakage points in the distribution subsystem, then the spurious signals from those several leakage points in the CATV distribution subsystem will tend to accumulate at the CATV transmission subsystem. The accumulated spurious signals can have considerable energy, thereby potentially causing interference with reverse path communication signals.

As a result, signal leakage is an undesirable phenomenon that CATV service providers strive to reduce.

In order to reduce leakage, CATV service providers must first determine the location of leakage points in the distribution subsystem. Various leakage detection devices are currently available that assist in the location of leakage points. Such devices typically include an antenna and a receiver that is tuned to a particular frequency in the CATV signal bandwidth. The detector further includes a signal strength measurement circuit. To detect leakage, a technician typically drives along a route that traces a portion of the CATV distribution system, preferably in the vicinity of a suspected leakage location. If the signal strength measurement circuit detects a relatively large amplitude signal at a particular location, then a leak may be indicated in or near that location. The technician may then use the leakage detector to pinpoint the source of the leak. Once the source of the leak is pinpointed, corrective action maybe taken.

A drawback of the above described leakage detection devices is their inability to distinguish CATV signals leaked from the system under test from other signals in the same bandwidth. This drawback is becoming of increasing importance due to the proliferation of CATV service providers. In particular, two or more CATV service providers often have portions of their distribution systems that overlap, or at least are disposed in close proximity to one another. As a result, when a technician detects leakage in a particular location, that leakage may either be caused by the system under test or by another system. Because CATV service providers are primarily interested only in leakage in their own distribution system, it is desirable to ascertain the identity of the source of the leak.

One prior art method of addressing the problem of differentiating the leakage signals from a system under test from other signals is described in U.S. Pat. No. 4,237,486 to Shimp, issued Dec. 2, 1980. Shimp describes a method of modulating a distinctive tagging signal on an unused CATV channel frequency at the transmission subsystem. The leakage detector is then tuned to that CATV channel frequency and used for leakage detection. If a relatively large signal strength is detected, the leakage detector then attempts to isolate or detect the distinctive tagging signal. If the tagging signal cannot be detected, then it is determined that the detected signals are not caused by leakage in the system under test. If, however, the tagging signal is detected, then it is determined that the detected signal is due to leakage in the system under test.

While the Shimp patent discusses a method of determining whether detected signals in the bandwidth of interest are caused by leakage by the system under test, that method requires an unused channel frequency. The requirement that an unused frequency be used undesirably consumes valuable CATV bandwidth.

U.S. Pat. No. 5,608,428 to Bush proposes a system in which a tagging signal is modulated onto an active video carrier, in other words, an in-use channel frequency. Specifically, a low frequency oscillating signal is modulated onto the active video carrier. That low frequency oscillating signal may then be detected by a leakage detector to determine whether a detected signal is caused by leakage by the system under test. The low frequency signal is chosen such that automatic gain control ("AGC") circuit in many subscribers' television receivers will reduce the interference caused by the low frequency signal. While the system proposed by Bush does not require an out of service channel for tagged leakage detection, the modulation of the low frequency signal nevertheless can cause undesirable signal distortion to some subscribers.

Accordingly, there is a need for a leakage tagging method and apparatus that does not require an out of use channel, but also has a reduced likelihood of producing distortion in the used channels of a CATV signal.

SUMMARY OF THE INVENTION

The present invention fulfills the above need, as well as others, by providing a leakage tagging method that inserts a tagging signal into a television signal only during times in which control information is present in the television signal. The control information in a television signal includes, for example, the vertical synchronization ("sync") information, the horizontal sync information, and potential quiet lines. By inserting the tagging signal only during times in which control information is present, the tagging signal generally does not interfere with the program information, in other words, the picture and sound information. As a result, the tagging signal of the present invention provides little or no perceptible distortion to the end user.

An exemplary method according to the present invention is a method of transmitting a tagging signal in a communication system, the communication system transmitting television signals comprising control information and program information. One step of the method includes generating a tagging signal that is detectable by corresponding leakage detecting equipment. The method also includes the step of identifying a portion of a television signal in which control information is present. Finally, the method of the present invention encompasses inserting the tagging signal into the television signal only during the portion of the television signal in which control information is present.

Optionally, the above exemplary method further includes inserting the tagging signal by first modulating a carrier signal with the tagging signal and summing the carrier signal modulated with the tagging signal with the television signal. In such an embodiment, it is preferably to use a carrier signal that has a frequency within the vestigial sideband of a CATV channel frequency. The vestigial sideband is a frequency band located below the carrier frequency associated with the CATV channel of the television signal, but above the frequency band used by the adjacent CATV channel.

The present invention further includes various apparatus for carrying out the above method. For example, one apparatus according to the present invention includes an arrangement for the insertion of a tagging signal into a television signal, the television signal comprising control information and program information, the television signal being transmitted by a communication system. Such an arrangement comprises an input, a tagging signal generator, a signal inserter, and a switch. Specifically, the input is connected to a source of television signals. The tagging signal generator is operable to generate a tagging signal that is detectable by corresponding leakage detecting equipment. The signal inserter, which is coupled to the input and the tagging signal generator, is operable to insert the tagging signal into the television signal. The switch is operably coupled to the signal inserter to cause the signal inserter to insert the tagging signal only during the portion of the television signal in which control information is present.

The above features and advantages, as well as others, will become more readily apparent to those of ordinary skill in the art by reference to the following detailed description and accompanying drawings.

DETAILED DESCRIPTION

Figure 1:
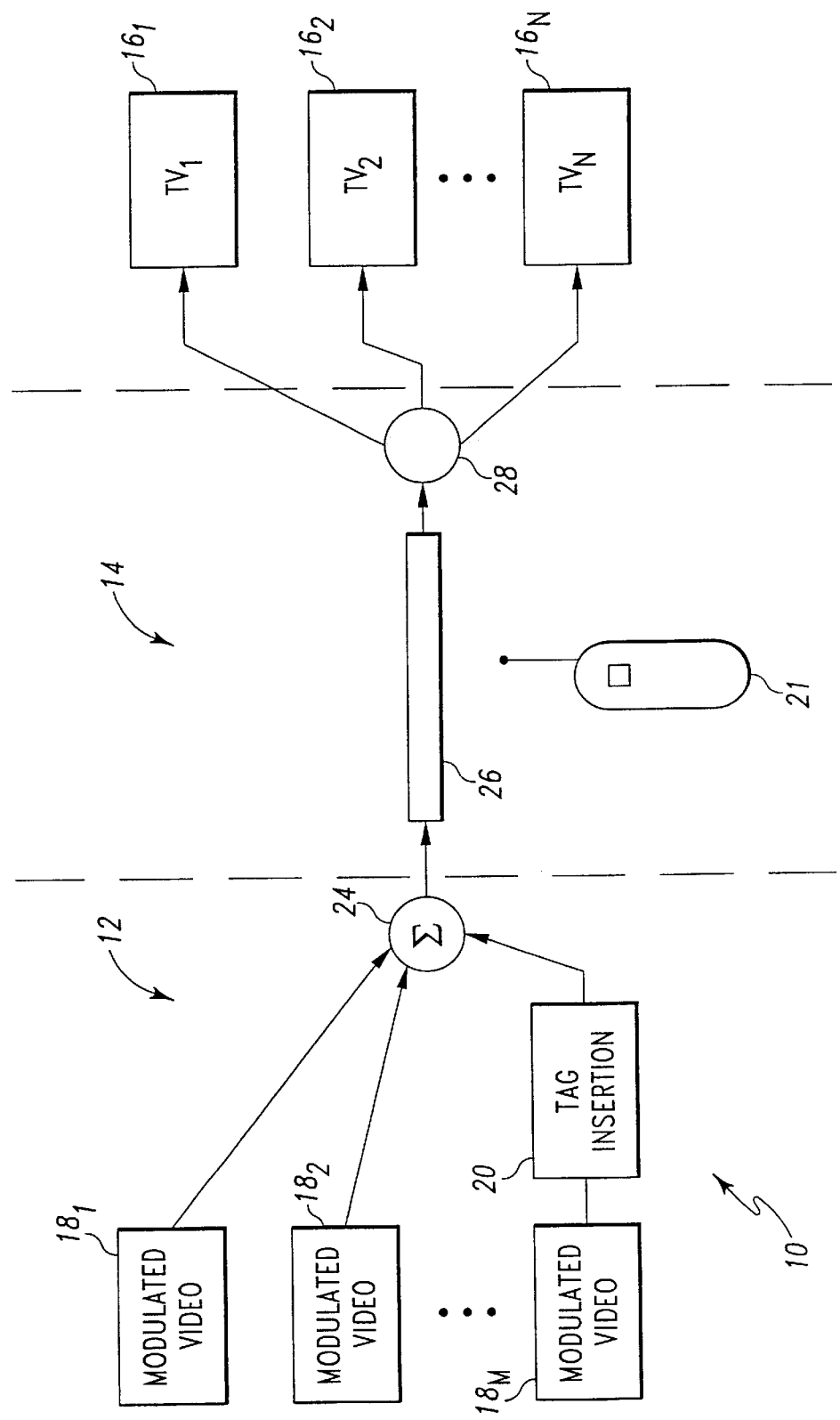
FIG. 1 shows a communication system including the an arrangement for inserting a tagging signal according to the present invention.

FIG. 1 shows a communication system including the an arrangement for inserting a tagging signal according to the present invention. In the present embodiment, the communication system is a CATV system 10 for transmitting and distributing television signals and other information to subscriber reception devices. The CATV system 10 in this embodiment transmits and distributes television signals in the NTSC standard format, which is well known to those of ordinary skill in the art. The CATV system 10 includes a head end transmission subsystem 12, a distribution subsystem 14, and a plurality of subscriber receivers shown by example herein as television receivers $16_1, 16_2, \ldots 16_N$. Subscriber receivers may alternatively include, among other things, video monitors and computer monitors.

The transmission subsystem 12 includes a plurality of sources of television signals, shown by example herein as modulated video sources $18_1, 18_2, \ldots 18_M$, and further includes a tag insertion arrangement 20 and a combiner 24. The transmission subsystem 12 is operable to generate a CATV signal as is known in the art, with the exception that a tagging signal is inserted according to the present invention. In general, a CATV signal as described herein includes, among other things, at least one television signal, the television signal including a baseband television signal modulated onto a carrier signal. Each carrier signal has a frequency associated with one of a plurality of CATV channels.

The modulated video source $18_1$ is a circuit well known in the art that includes a carrier signal generator, not shown, and a baseband television signal source, not shown. The modulated video source is operable to generate a television signal which comprises a carrier signal modulated by a baseband television signal. Likewise, the modulated video sources $18_2 \ldots 18_M$ are operable to generate television signals which comprise carrier signals modulated by television baseband signals.

Each modulated video source $18_x$ is typically associated with one of a plurality of CATV channels. Specifically, the television signal carrier frequency, or CATV channel frequency, corresponds to an associated CATV channel. The CATV channel frequencies are typically within the 5 MHz to 1000 MHz frequency band, and are separated by a predetermined frequency interval. In United States cable systems, the CATV channel frequencies are typically separated by 6 MHz or integer multiples thereof.

The modulated video sources $18_1, 18_2, \ldots 18_M$ are each connected to the signal combiner 24, which combines the various television signals into a single broadband CATV signal. According to the exemplary embodiment of the present invention described herein, the modulated video source $18_M$ is connected to the signal combiner 24 through the tag insertion arrangement 20.

The tag insertion arrangement 20 is a circuit that is operable to generate a tagging signal that is detectable by corresponding leakage detecting equipment. A tagging signal is a signal having some source-identifying information that may be recognized by the leakage detecting equipment. For example, in the present embodiment, the tagging signal includes a 20-29 Hz sine wave component. The leakage detecting equipment, shown here by exemplary leakage detector 21, is operable to isolate or detect that sine wave component, thereby confirming the source of detected signals. Such confirmation of source allows the leakage detecting equipment to distinguish leakage signals of the system under test from either spurious signals of unknown origin or leakage signals of a co-located CATV system.

In accordance with one embodiment of the present invention, the tag insertion arrangement 20 is operable to receive the television signal from the modulated video source $18_M$ and identify portions of television signal in which the baseband television signal contains only control information. Specifically, a baseband television signal has a standard format that includes program information and control information. In most systems, the program information consists of the image information, such as chrominance and luminance information, and audio information. By contrast, the control information in general, does not include such image or audio content. The control information instead comprises the horizontal and vertical sync information, and may further include so-called quiet lines. An important aspect in the control information is that it follows a repeating pattern for each frame of video information. For example, the vertical sync information of a NTSC television signal, referred to as the vertical interval, occurs twice every frame, or at a frequency of approximately 60 Hz. Horizontal sync information and quiet lines also occur at regular repeating intervals.

The tagging signal generator 20 is thus operable to identify the repeating occurrences of at least one type of control information, for example, the vertical interval, within the television signal. The tagging signal generator 20 is further operable to insert the tagging signal into the television signal during portions of the television signal when control information is present.

In the preferred embodiment described herein, the tag insertion arrangement 20 is operable to perform such insertion by first modulating the tagging signal onto a carrier signal having a frequency within the vestigial sideband associated with the television signal. The carrier signal modulated with the tagging signal is then combined with the television signal. As will be discussed further below, use of the vestigial sideband carrier signal for the tagging signal further reduces the potential for interference that is perceptible by subscribers.

Figure 2:
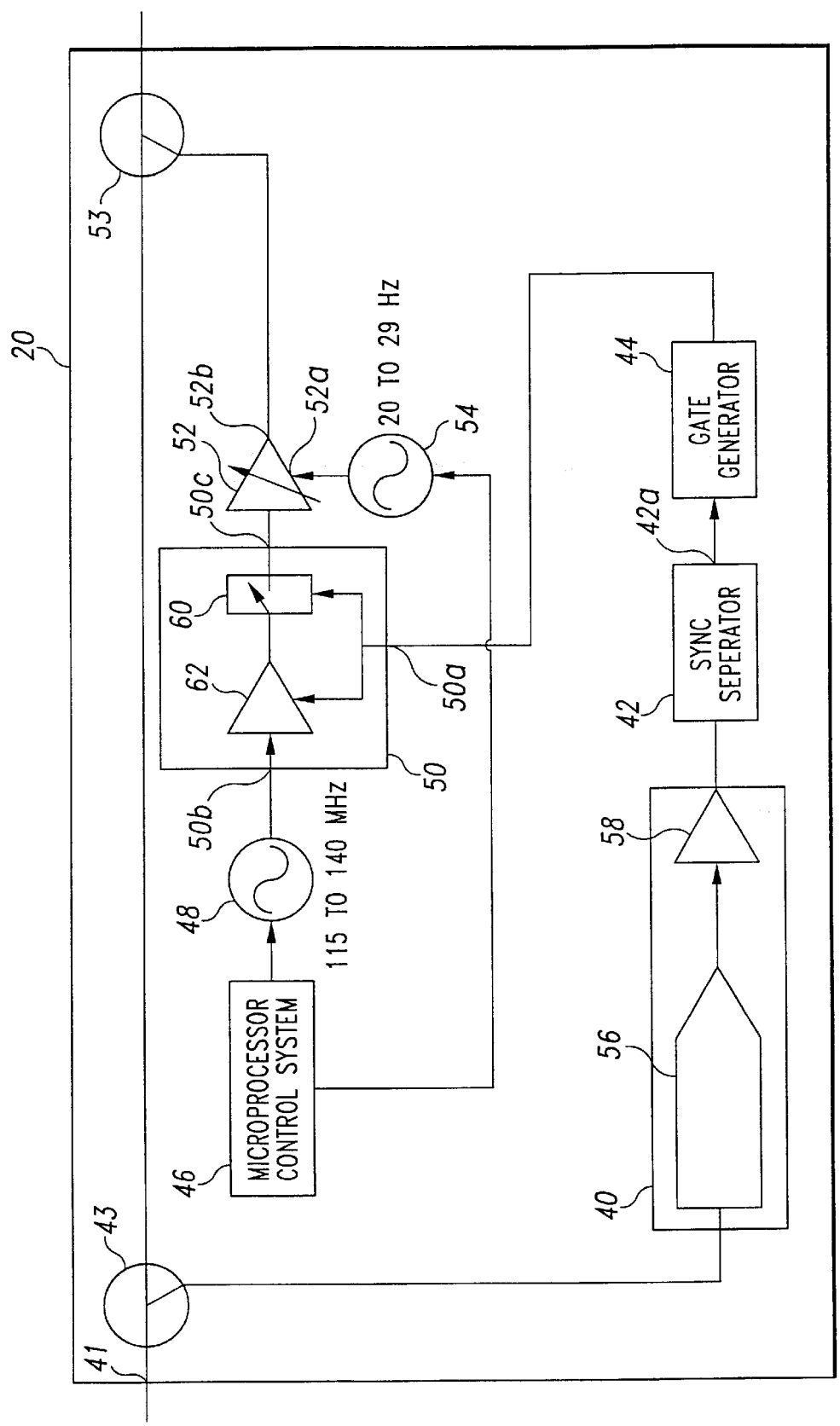
FIG. 2 shows an exemplary tag insertion arrangement according to the present invention.

FIG. 2, discussed further below, shows an exemplary embodiment of tag insertion arrangement according to the present invention having the capabilities discussed above.

Continuing with the discussion of FIG. 1, the combiner 24 is connected to provide CATV signals to the distribution system 14. The distribution system 14 typically comprises a plurality of elements including coaxial cable, repeater amplifiers, splitters and other elements typically employed by CATV service providers. By way of representative illustration only, the distribution system 14 is shown herein as including a cable 26 and a splitter 28. The cable 26 typically comprises a network of coaxial cable or other suitable conduit for transmission of CATV signals through a geographical area interspersed with subscribers.

In the example discussed herein, the cable 26 connects the combiner 24 to the splitter 28. The splitter 28 is then connected to the plurality of television receivers $16_1 \ldots 16_N$. The television receivers $16_1 \ldots 16_N$ are, in general, commercially available television receivers designed or adapted to receive CATV signals and tune to particular channels within the CATV signal. While the performance of various types of televisions differ somewhat, substantially all commercially available televisions are designed to include tuning and filtering equipment having a minimum standard performance criteria.

Regardless of the particular make-up, the distribution system 14 is susceptible to faults, cable breaches, faulty interconnections, and other nonconformities that allow leakage. Leakage refers to both egress of CATV signals from the distribution system 14 and ingress of spurious signals into the CATV system. The egress of the CATV signal out of the distribution system 14 can potentially interfere with aeronautical communication and ingress of spurious signals increases the noise within the CATV system.

The tag insertion arrangement 20 of the present invention generates a unique tagging signal that facilitates the detection of such leaks. An exemplary operation of the tag insertion method and apparatus within the CATV system 10 is discussed herebelow.

In general, the plurality of the modulated video sources $18_1 \ldots 18_M$ generate television signals associated with one of a plurality of CATV channels. As discussed above, the baseband television signal comprises program information, in other words, information related to image and audio content, and control information, such as synchronization information. The format of a television baseband signal is standardized such that the control information is substantially similar on all television baseband signals. For the purposes of this description, control information includes the horizontal synchronization pulses, the vertical interval, and quiet lines that may or may not be used to transmit other non-image related information.

Each of the modulated video sources $18_1 \ldots 18_M$ further generates a vestigial sideband related to each carrier signal. In particular, when a baseband television signal is modulated onto a CATV channel carrier signal, two mirror image frequency spectra, referred to as sidebands, are produced. Thus, for example, if the baseband television spectrum is assumed to be approximately 4.5 MHz, then the modulation of the signal onto the CATV channel carrier signal produces sidebands extending ±4.5 MHz from the CATV channel frequency. Because only one sideband is necessary to reproduce the signal, one of the sidebands is filtered out to conserve bandwidth. In particular, the sideband that extends from the CATV channel frequency to 4.5 MHz below the CATV channel frequency is substantially filtered out to allow use of that bandwidth by the adjacent CATV channel. A portion of the filtered spectrum, however, is not used by the adjacent CATV channel. That portion is referred to as the vestigial sideband of television signal. In United States CATV systems, the vestigial sideband is typically up to 1.5 MHz below the CATV channel frequency. Accordingly, each of the modulated video sources $18_1 \ldots 18_M$ generates dual sidebands and then through filtering, substantially attenuates one of the sidebands, thereby creating a vestigial sideband.

The operation of the modulated video carrier $18_M$ is now discussed in further detail as it relates to tag insertion according to the present invention. The modulated video carrier $18_M$ generates a first television signal and provides that signal to the tag insertion arrangement 20. The tag insertion arrangement 20 then identifies the portions of the television signal, and particularly, the television baseband signal, in which control information is present. In the exemplary embodiment described herein, the tag insertion arrangement 20 determines the portions of the television signal in which the vertical interval is present.

Contemporaneously, the tag insertion arrangement 20 generates a unique tagging signal, preferably consisting of a low frequency oscillating signal. In the exemplary embodiment described herein, the tagging signal is a 25 Hz sine wave signal. The tag insertion arrangement 20 then modulates the tagging signal onto a carrier signal. The carrier signal has a frequency within the vestigial sideband of the first television signal, and preferably, within 0.9 MHz to 1.15 MHz below the CATV channel frequency.

The tag insertion arrangement 20 then inserts the tagging signal, which has been modulated onto the carrier signal, into the television signal only during the portions of the television signal in which control information is present. Specifically, the tag insertion arrangement 20 inserts the tagging signal in a repeating pattern that corresponds to the predictable and repeating occurrence of one of the types of control information in the television signal. In the example described herein, the tag insertion arrangement 20 inserts the tagging signal in a repeating pattern that corresponds to the repeating occurrence of the vertical interval in the television signal.

As a result, the tag insertion arrangement 20 of the exemplary embodiment described above generates a pulsed RF tagging signal. In particular, the modulation of the low frequency tagging signal onto the carrier signal creates an RF tagging signal, and the controllable insertion of the tagging signal into the television signal during only the repeating control information portions of the television signal creates a pulsed RF tagging signal. The frequency with which the tagging signal is inserted or pulsed is referred to as the pulse frequency. Thus, in the embodiment described herein, the pulse frequency is equal to the frequency with which the vertical interval occurs, or 60 Hz.

It will be noted that the low frequency tagging signal is preferably chosen to be below one-half the pulse frequency. Specifically, as will be discussed below, a preferred method of detecting the tagging signal is to extract the tagging signal frequency component from the pulsed RF tagging signal. Because the tagging signal is only present the pulses of the pulsed RF tagging signal, the tagging signal must be detectable from those pulses. Accordingly, to be able to detect the tagging signal, the frequency of the tagging signal should be below the Nyquist frequency defined with respect to the pulse frequency. In the example described herein, wherein the tagging signal is inserted only during the vertical interval of the television signal, which occurs at a frequency of about 60 Hz, the tagging signal preferably has a frequency of less than 30 Hz.

Moreover, the use of extremely low tagging signal frequencies, such as those significantly below 20 Hz, tends to increase the possibility of interference from multipath signals. In particular, leakage detection is often carried out by a technician in moving vehicle. It has been observed that moving vehicles are particularly susceptible to multipath signals, which can create, from the vehicle's point of view, an amplitude modulated signal having a frequency below 20 Hz.

As a result, the tagging signal is preferably below one-half the pulse frequency and at least 20 Hz. Accordingly, in the embodiment described herein, the tagging signal preferably is a low frequency oscillating signal having a frequency between 20 Hz and 29 Hz.

The tag insertion arrangement 20 then provides the first television signal and pulsed RF tagging signal to the combiner 24. The combiner 24 then combines those signals with the television signals from the other modulated video sources $18_1 \ldots 18_M$ to produce a broadband CATV signal for transmission. The combiner 24 provides the broadband CATV signal to the cable 26.

The CATV signal traverses the cable 26 to the splitter 28. The splitter 28 then distributes the CATV signal to each of the television receivers $16_1 \ldots 16_N$. One or more of the television receivers $16_1 \ldots 16_N$ tunes to a select CATV channel and performs the appropriate signal processing to provide a visible and audible presentation of the program information.

The pulsed RF tagging signal does not significantly interfere, nor perceptively interfere, with the visible and audible presentation of the program information in the first television signal or any other television signal. In particular, standard IF filters within the television receivers $16_1 \ldots 16_N$ substantially attenuate the vestigial sideband of the CATV channels to which they are tuned. Accordingly, the IF filter of any television receiver tuned to receive the first television signal would essentially filter out the pulsed RF tagging signal.

Moreover, the synchronization of the insertion of the tagging signal with the control information portions of the first television signal ensure that any potential low level interference caused by the tagging signal only affects the non-program information portions. As a result, the video and audio information is not adversely affected by the tagging signal.

It will be understood that other embodiments of the present invention are possible that employ only one of the above-described interference reduction features. One such embodiment employs the technique of controllably inserting the tagging signal exclusively during control information portions of the television signal, whereby the tagging signal is inserted by modulating the tagging signal directly onto the television signal itself. In such a case, the generation of a vestigial sideband carrier signal is not necessary. Such an embodiment is described in further detail below in connection with FIG. 6. While such an embodiment would ostensibly reduce component cost by eliminating the need to generate a vestigial sideband carrier signal, the possibility of interference with the picture and/or sound quality perceived by the end user may undesirably increase.

Alternatively, the use of the vestigial sideband may sufficiently reduce the possibility of interference with picture and sound quality such that the tagging signal need not be inserted exclusively during the control information portions of the television signal. Accordingly, the tagging signal could be modulated onto the vestigial sideband carrier signal and combined continuously with the first television signal. As above, although continuous insertion of the RF tagging signal may reduce component cost, the possibility of perceptible interference may increase.

FIG. 2 shows a block diagram of an exemplary embodiment of the tag insertion arrangement 20 of FIG. 1. The tag insertion arrangement 20 is operable to generate a pulsed RF tagging signal as described above in connection with FIG. 1, and insert the pulsed RF tagging signal into a television signal of a CATV channel. As discussed above, the pulsed RF tagging signal is detectable by corresponding leakage detection equipment and introduces little or no degradation to the image and audio information perceived by the subscriber.

While the pulsed RF tagging signal is substantially transparent or undetectable by the end user, the leakage detector 21 readily detects the RF tagging signal if placed in the vicinity of leakage in the distribution system 14. In leakage detection operation, a field technician moves the leakage detector 21 along various portions of the distribution system 14 to attempt to identify sources of leakage. The leakage detector 21 is a device that detects RF signals within the frequency band of the pulsed RF tagging signal and is further operable to identify the distinctive low frequency tagging signal that has been modulated onto the carrier signal and pulsed in synchronization with the control information portions of a standard television signal.

If the leakage detector 21 detects sufficient signal energy within the appropriate signal band, and further identifies a substantial low frequency tagging signal component in the detected signal energy, then the technician may determine the existence and location of a leakage situation in the distribution system 14. A suitable leakage detection device is described below in connection with FIG. 4.

Accordingly, the present invention, like other tagging arrangements, utilizes a tagging signal to allow the leakage detector to discriminate between a signals caused by leakage in the CATV system under test and spurious signals in the same frequency band. However, in contrast to the prior art, the present invention further provides a leakage tagging arrangement which causes little or no disruption of the television picture or sound quality. Specifically, use of the vestigial sideband of a particular CATV channel reduces the potential for interference with that (or any other) CATV channel television signal. Additionally, even if some low level interference into the television signal band did occur, the insertion of the tagging signal into the television signal only during the control information portions further reduces any chance that the tagging signal will affect picture and sound quality.

The tag insertion arrangement 20 of FIG. 2 includes a detector 40, a television signal input 41, a synchronization circuit 42, a splitter 43, a gate generator 44, controller 46, a carrier signal generator 48, a pulse switch 50, a low frequency tagging signal generator 54, and a signal inserter comprising a variable gain amplifier ("VGA") 52 and a two port combiner 53. In the exemplary embodiment described herein, the detector 40 further comprises a log amplifier detector 56 and an amplifier 58. Alternatively, the detector 40 may comprise another type amplitude modulation detector, such as a diode detector.

The television signal input 41 is operably connected to receive the first television signal from the modulated video source $18_M$ (see FIG. 1) and provide that signal to the splitter 43. The splitter 43 is connected to provide the first television signal to the log amplifier detector 56 and the two port combiner 53. The log amplifier detector 56 is further connected to the amplifier 58. The amplifier 58 is an inverting amplifier that is operably connected to the synchronizer circuit 42.

The synchronizer circuit 42 is a circuit that is operable to detect the vertical interval in a baseband television video signal. In the exemplary embodiment described herein, the LM1881 video sync separator integrated circuit available from National Semiconductor Corporation is used as the synchronizer circuit 42. The synchronizer circuit 42 includes a vertical sync output 42a that is connected to the gate generator 44. The gate generator 44 is a circuit operable to receive signals from the vertical sync output of a synchronizer circuit such as the synchronizer circuit 42 and generate a gate pulse signal therefrom. The gate pulse signal is a pulse signal that comprises pulses that are substantially synchronous with the vertical interval of the first television signal.

The gate generator 44 is connected to a control input 50a of the pulse switch 50. The pulse switch 50 further includes an RF input 50b and an RF output 50c. The pulse switch 50 is a device or circuit that operates as a controllable switch with a high degree of isolation. The pulse switch 50 in the exemplary embodiment described herein comprises an RF switch 60 and a switchable amplifier 62, each having a control input connected to the control input 50a. The use of two devices, in other words, the RF switch 60 and the switchable amplifier 62, enables the pulse switch 50 to provide a higher degree of isolation. It will be understood that more or less isolation may be provided by increasing or decreasing, respectively, the number of switching devices.

The controller 46, which may suitably be a microprocessor, is operably connected to control the operations of the carrier signal generator 48 and the low frequency tagging signal generator 54. The carrier signal generator 48 comprises an oscillator circuit that is operable to generate an RF signal having a frequency within at least some portion of the CATV signal bandwidth. In the exemplary embodiment described herein, the carrier signal generator 48 is operable to generate RF signals having a frequency between 115 MHz and 140 MHz. The 115 MHz to 140 MHz frequency band includes the frequency band in which CATV system leakage is typically tested. The carrier signal generator 48 is connected to provide the generated RF carrier signal to the RF input 50b of the pulse switch 50.

The RF output 50c of the pulse switch is operably connected to the VGA 52. The VGA 52 includes a control input 52a connected to the low frequency tagging signal generator 54. The VGA 52 is an RF amplifier that provides amplification at a level corresponding to control signal at its control input 52a. As such, the VGA 52 may be used to amplitude modulate the input RF carrier signal. It will be understood that the VGA 52 may alternatively be replaced by another amplitude modulation means, such as, for example, a variable attenuator.

The low frequency tagging generator 54 is preferably an oscillator operable to generate a 20 Hz to 29 Hz sine wave signal and is connected to provide that signal to the control input 52a of the VGA 52. The RF output 52b of the VGA 52 is coupled to the two port combiner 53. The two port combiner 53 is then further connected to combiner 24 of FIG. 1.

Alternatively, the controller 46 may include a square wave oscillating output that is directly connected to the control input 52a. In such a case, the controller 46 would comprise the low frequency tagging generator. One potential drawback to such an approach is that the square wave produced by the controller 46 is more likely to introduce undesirable noise than a sine wave produced by a sine wave oscillator.

In the operation of the tag insertion arrangement 20 of FIG. 2, the log amplifier detector 56 receives the first television signal from the television signal input 41 through the splitter 43. The first television signal preferably has a CATV channel (carrier) frequency of between 115 and 140 MHz. For the purposes of this example, the first television signal is assumed to have a channel frequency of 133.2625 MHz, and is assumed to conform with NTSC standards. The first television signal furthermore has a signal band from approximately 131.7675 to 137.7625 MHz, which includes a video signal band, an audio subcarrier, a chrominance subcarrier, and a vestigial sideband. The video signal band extends from 133.2625 MHz to approximately 137.4625 MHz. The audio subcarrier is located at 137.7625 MHz and the chrominance subcarrier is located at 136.8425 MHz. The vestigial sideband extends from approximately 131.7675 MHz to approximately 133.2625 MHz. It is noted that the lower limit of vestigial sideband is defined by the location of the audio subcarrier frequency of the adjacent CATV channel, which is located at approximately 131.7675 MHz. The video signal band, the audio subcarrier, and the chrominance subcarrier are collectively referred to as the active sideband.

From the first television signal, the log amplifier detector 56 generates a signal that is representative of the logarithmic value of the amplitude modulation of the first television signal. In other words, because only the video signal (as opposed to the audio signal and chrominance signal) is amplitude modulated, the log amplifier detector 56 essentially generates a form of the video baseband signal. Such detectors are well known. The log amplifier detector 56 provides the signal to the amplifier 58. The amplifier 58 amplifies and inverts the log amplifier detector output signal to convert it into the proper format for use by the synchronization circuit 42. The converted signal is referred to herein as the modified television baseband signal.

The synchronization circuit 42 receives the modified television baseband signal from the inverting amplifier 58 and generates a vertical sync output signal therefrom. To this end, the synchronization circuit 42 provides a vertical sync output signal pulse that is approximately synchronous with the first serration pulse of each vertical interval of the first television signal. The vertical sync output signal pulse has a duration that is typically less than the duration of the vertical interval.

Figure 3:
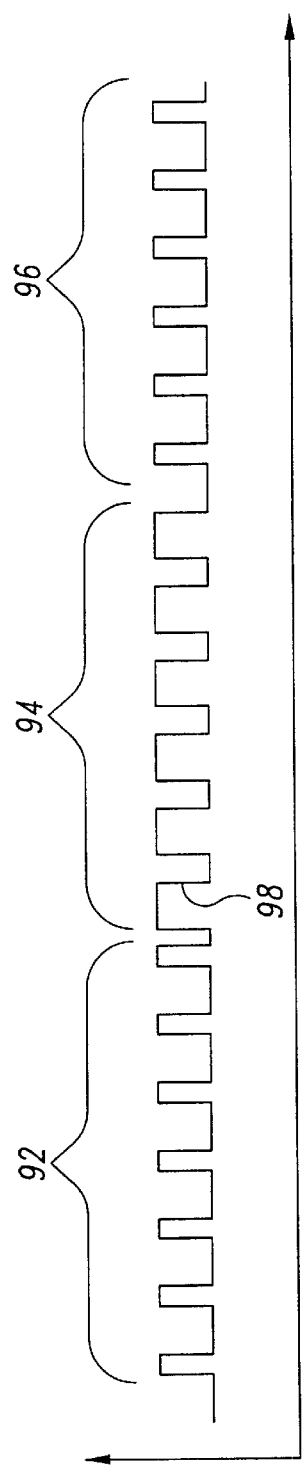
FIG. 3 shows a signal timing diagram of a vertical interval in a standard NTSC baseband television signal.

FIG. 3 shows a signal timing diagram of the vertical interval of a standard NTSC baseband television signal. The vertical interval includes a plurality of equalization pulses 92 followed by a plurality of serration pulses 94, followed by another plurality of equalization pulses 96. The synchronization circuit 42 of FIG. 2 generates the vertical sync output signal pulse upon the detection of the transition low 98 of the first serration pulse. The vertical sync output signal pulse has a duration of less than the entire vertical interval.

Referring again to FIG. 2, the synchronization circuit 42 provides the vertical sync output signal to the gate generator 44. The gate generator 44 then uses the vertical sync output signal and a priori knowledge about standard baseband television signal format to provide a gate signal having a pulse that begins at approximately the beginning of the next occurring vertical interval and has a duration approximately equivalent to the vertical interval. A gate generator circuit having such capabilities may readily be implemented by those of ordinary skill in the art, and may include, for example, one or more one-shot devices having timing characteristics that correspond to the standard television video signal format.

The gate signal is then provided to the control input 50a of the pulse switch. The gate signal "on" pulse causes the switchable amplifier 62 to turn on and the RF switch 64 to close. Meanwhile, the controller 46 causes the carrier signal generator 48 to generate a carrier signal having a frequency within the vestigial sideband of the first television signal. Preferably, the controller 46 causes the carrier signal generator 48 to generate a carrier signal having a frequency 0.9 MHz to 1.15 MHz below the CATV channel frequency of the television signal. Accordingly, in the example discussed herein, the carrier signal generator 48 generates a carrier signal having a frequency between 132.1125 MHz and 132.3625 MHz. Such frequencies are both sufficiently below the video signal band of the first television signal and sufficiently above the audio subcarrier of the adjacent CATV channel so as to reduce the potential for noticeable interference to the end users tuned to either CATV channel.

In any event, the pulse switch 50 receives the carrier signal at the RF input 50b and provides the carrier signal at its RF output 50c only when the switchable amplifier 62 is turned on and the RF switch 64 is closed. Accordingly, the pulse switch 50 provides the carrier signal to the RF output 50c synchronous to the vertical interval of the first television signal.

During the gate signal pulse, the carrier signal propagates to the VGA 52, which then amplitude modulates the carrier signal with the tagging signal produced by the low frequency tagging signal generator 54. In particular, VGA 52 provides an amplitude modulation which may be expressed as $A \cos(2\pi f_{tag} t)$ where A is the tag amplitude and $f_{tag}$ is the frequency of the tagging signal. Preferably, the tagging signal is approximately 3 dB depth modulated onto the carrier signal. The amplitude modulated carrier signal is then provided to the two port combiner 53, where it is added to the first television signal received from the splitter 43.

When the vertical interval is not present, the gate generator 44 provides no pulse to the pulse switch 50. As a result, the carrier signal generated by the carrier signal generator 48 is not provided to the pulse switch output 50c. The VGA 52 thus does not receive or modulate any carrier signal, and no signal is inserted into television signal.

The tagging signal is thus inserted into the television signal only during the vertical interval of the television signal. The two port combiner 53 thus produces as an output a pulsed RF tagging signal and the first television signal.

It will be noted that the carrier signal generator 48, the pulse switch 50, and the VGA 52 are selected such that the pulsed RF tagging signal has a predetermined peak power level, preferably on the order of 5 dB below the peak power level of the first television signal.

In any event, the two port combiner 53 provides the combined television signal and pulsed RF tagging signal to the combiner 24 of the transmission subsystem 12 of FIG. 1. As discussed above in connection with FIG. 1, the pulsed RF tagging signal is thereafter transmitted over the CATV distribution system.

The tagging signal is detectable by a suitable leakage detector, but should not noticeably affect video or audio signal quality in the destination point television receivers. In particular, the IF filters of substantially all commercially available televisions will sufficiently attenuate the vestigial sideband of each television signal, thereby substantially attenuating the carrier signal modulated with the tagging signal. Moreover, any vestige of the tagging signal that is not attenuated by the television IF filter will only appear in the vertical interval of the first television signal. Because the vertical interval of any television signal is not user-viewable (or audible) program data, the pulsed tagging signal will not affect the perceivable video and/or audio program content.

Figure 4:
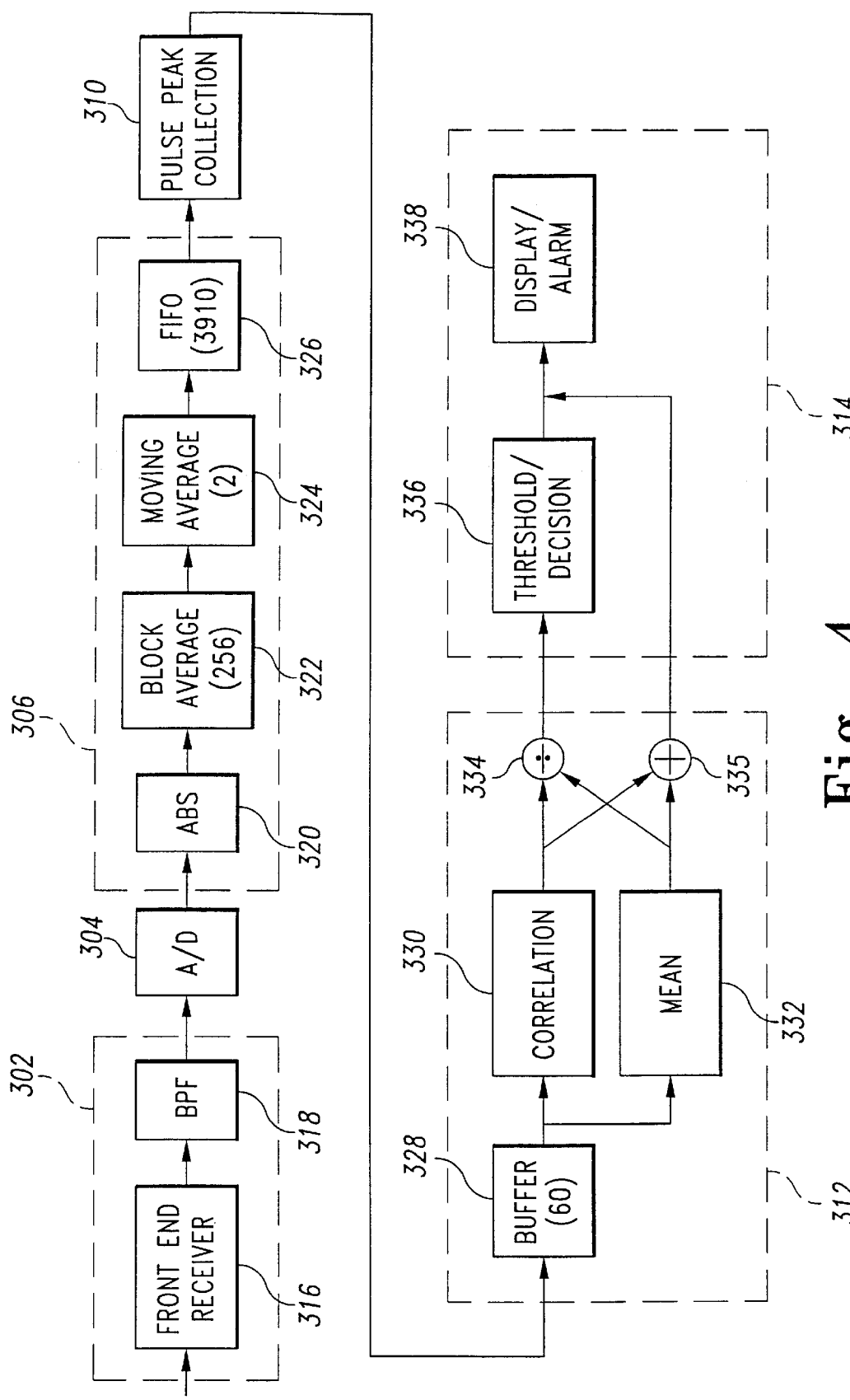
FIG. 4 shows an exemplary leakage detector for use in detecting leakage signals tagged in accordance with the present invention.

FIG. 4 shows a circuit block diagram of an exemplary leakage detector 300 operable to detect and measure a pulsed RF tagging signal such as that produced by the tag insertion arrangement 20 described above in connection with FIGS. 1 and 2. More particularly, the leakage detector 300 is operable to detect and measure leakage signals in a television signal distribution subsystem, using the distinctive tagging signal to discriminate between leakage signals of the system under test and spurious RF signals generated by other sources. To this end, the leakage detector 300 measures the energy level or signal strength at the frequency on which the pulsed RF tagging signal has been modulated, and then determines whether the distinctive tagging signal is present.

The leakage detector 300 includes an RF receiver circuit 302, an analog to digital ("A/D") converter 304, a digital filter circuit 306, a pulse extraction circuit 310, a tag signal extraction circuit 312, and an output circuit 314.

For the purposes of describing the leakage detector 300, it is assumed that the pulsed RF tagging signal comprises a 25 Hz oscillating signal modulated onto an RF carrier signal of 132.2625 MHz, which is within the vestigial sideband of the CATV channel at 133.2625 MHz. The pulsed RF tagging signal is furthermore pulsed or inserted into the television signal on the CATV channel in synchronization with the vertical intervals of the television signal. The television signal is assumed to have a standard NTSC television signal format. As a result, the pulses of the pulsed RF tagging signal appear at a frequency of approximately 60 Hz, which is the frequency of the vertical interval.

Referring again to FIG. 4, the RF receiver circuit 312 is a circuit operable to receive the pulsed RF tagging signal and perform frequency conversion and filtering thereon to produce an intermediate frequency ("IF") signal. In the exemplary embodiment described herein, the IF signal preferably has a 93 kHz bandwidth centered at 75 kHz. To this end, the RF receiver circuit preferably includes a front end receiver 316 and a band pass filter 318. The front end receiver 316 includes front end filtering, amplification and frequency conversion circuitry operable to receive the broadband CATV signal and produce an IF signal comprising the pulsed RF tagging signal centered at 75 KHz.

A suitable front end receiver circuit 316 and band pass filter 318 would be known to those of ordinary skill in the art. For example, U.S. patent application Ser. No. 08/767, 991, which is assigned to the assignee of the present invention and incorporated herein by reference, describes such a suitable front end receiver circuit and corresponding band pass filter.

The A/D converter 304 receives the IF signal and generates a digital IF signal therefrom. In the embodiment described herein, the A/D converter 304 has a sampling rate of 1 MHz. The digital IF signal comprises a sampled version of the frequency converted pulsed RF tagging signal.

The digital input circuit 306 then performs demodulation and decimation on the digital IF signal to produce a digital baseband signal. The digital baseband signal, as a result of the decimation, has an effective sampling rate of approximate 3900 Hz. The digital baseband signal is a digital representation of the pulsed tagging signal, with pulses occurring at a frequency of about 60 Hz.

In particular, the digital input circuit 306 comprises the following functional blocks: an absolute value block 320, averaging block 322, moving average block 324, and buffer 326. The above-referenced functional blocks are digital signal processing blocks described herein in terms of their function. It shall be noted that the operations of the various functional blocks may suitably be carried out through a digital signal processor, one or more field programmable gate arrays, discrete components, or a combination thereof.

In any event, the absolute value block 320 operates to obtain the absolute value of each sample of the input 1 MHz digital IF signal. The absolute value block 320 then provides the absolute value samples to the averaging block 322. The averaging block 322 takes a block average of each successive set of 256 adjacent absolute value samples and produces an output sample consisting of the average value for that set of samples. For example, the averaging block 322 receives sample numbers 0-255 and produces a first output sample having the average value of those samples, then receives sample numbers 256-511 and produces a second output sample having the average value of those samples, and so forth.

As a result, the averaging block 322 produces one output sample for every 256 input samples, or one output sample for every 256 $\mu$-secs. The block averaging function of the averaging block 322 thus provides the decimation and the demodulation functions of the digital input circuit 306.

The averaging block 322 then provides the output samples to the moving average block 324. The moving average block 324 generates a running average of every two output samples from the averaging block 322. For example, the moving average block 324 takes the average of samples 1 and 2 from the averaging block 322, then takes the average of samples 2 and 3 from the averaging block 322, and so forth. As a result, the moving average block 324 effectively produces a sample for every sample it receives from the averaging block 322. The operation of the moving average block 324 provides additional filtering to the decimated and demodulated digital IF signal.

The moving average block 324 provides the moving average output samples to the buffer 326. The buffer 326 stores samples for several pulse periods, where pulse period is the time between two pulses in the pulsed RF tagging signal. Accordingly, in the example described herein, the pulse period is 1/60th of a second. The buffer 326 preferably stores samples corresponding to an entire second, or 60 pulse periods.

The absolute value, averaging and moving averaging functions of the digital input circuit 306 thus operate to decimate and demodulate the digital IF signal, thereby producing the digital baseband signal. As discussed above, the digital baseband signal comprises samples having an effective sampling rate of approximately 3.9 kHz which provide a digital representation of the pulsed tagging signal.

The pulse extraction circuit 310 then receives the digital baseband signal and generates a digital pulse signal therefrom. The resulting digital pulse signal comprises a series of digital samples in which each sample represents the peak value of each pulse in the digital baseband signal. Specifically, the pulse extraction circuit 310 essentially extracts one digital baseband signal sample for each pulse. Thus, because the digital baseband signal comprises a digital representation of a pulsed tagging signal having pulse frequency of approximately 60 Hz, the pulse extraction circuit 310 generates a digital pulse signal consisting of a 60 sample per second signal.

Figure 5:
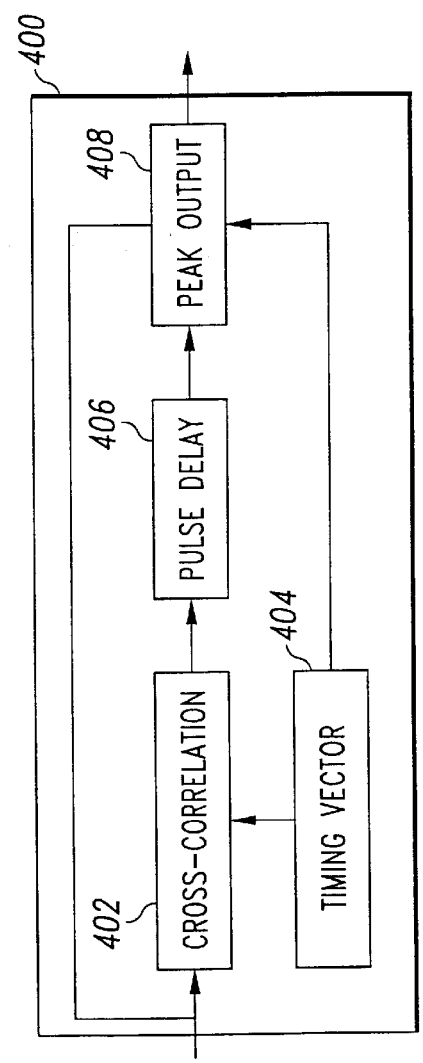
FIG. 5 shows a pulse peak detection circuit for use in the leakage detector of FIG. 4.

FIG. 5 shows an exemplary pulse extraction circuit 400 which may be used as the pulse extraction circuit 310 of FIG. 4. The pulse extraction circuit 400 includes a cross correlation block 402, a timing vector 404, a pulse phase block 406 and a peak output block 408. Those of ordinary skill in the art may readily implement the various functional blocks of the pulse extraction circuit 400 using discrete components, a programmable digital signal processing circuit, or the like.

The timing vector 404 comprises a series of N binary samples, where N is the number of digital baseband signal samples stored in the buffer 326. In the example described herein, N is the number of samples in one second, which is approximately equal to 3910. Within the series of N binary samples, every Mth sample has a value of "1" while all other samples have a value of "0", where M is the number of samples in a pulse period. Accordingly, the timing vector is essentially a series of binary samples that have a "0" value except for one sample that has a "1" value that appears every ⅙₀th of a second. The timing vector 404 provides such samples to the cross correlation block 402 and the peak output block 408.

Contemporaneously, the cross correlation block 402 receives the digital baseband signal in blocks of N samples, in other words, one second's worth of samples, from the buffer 326 of the digital input circuit 306. The cross-correlation block 402 performs a cross correlation between the digital baseband signal samples and the timing vector samples to generate a series of values from which the pulses may be identified. The cross-correlation with the timing vector is necessary because the digital baseband signal has a relatively low signal to noise ratio.

To carry out the cross correlation, the cross correlation block generates cross correlation values, CX(m), for m=0 to M−1 using the following equation:

$$CX(m) = \Sigma s(n) * V(n+m), \text{ for } n=0 \text{ to } N-1,$$

where s(n) is the nth sample of the N digital baseband signal samples received from the buffer 326, and V(n+m) is the (n+m)th sample of the timing vector 404.

The cross-correlation block 402 provides the CX(m) values to the pulse delay block 406. The pulse delay block identifies the maximum CX(m) value, and provides the m-value of that maximum to the peak output block 408. The m-value represents the phase delay between the "1" samples in the timing vector 404 and the pulses in the digital baseband signal.

The peak output block 408 also receives the N digital baseband signal samples and the timing vector 404. Using the timing vector 404 for pulse frequency information, and the m-value as the pulse phase information, the peak output block 408 provides as output a single sample from the digital baseband signal for each pulse occuring therein. As a result, the peak output block 408 generates a digital pulse signal comprising N/M output samples for each N digital baseband signal samples received. As mentioned above, in the example described herein, the digital pulse signal comprises 60 samples per second.

The resulting digital pulse signal is then provided to the tag signal extraction circuit 312. In general, the tag signal extraction circuit 312 generates two outputs. The first output is a measurement of the pulse peak amplitude, PP. The pulse peak amplitude is representative of the signal strength of the pulsed RF tagging signal detected at the RF receiver circuit 30. The second output is the $f_{tag}$ component relative to the pulse peak amplitude, or simply relative $f_{tag}$ component, where $f_{tag}$ is the frequency of the inserted tagging signal. The relative $f_{tag}$ component is representative of the tag amplitude, A, generated within the tag insertion arrangement 20 of FIG. 2. In general, the pulse peak amplitude generally describes the strength of the signal detected at the relevant RF frequency, while the relative $f_{tag}$ component identifies whether that signal strength was generated by a pulsed RF tagging signal generated according to the present invention.

Accordingly, in the example described herein, the tag extraction circuit 312 generates a pulse peak amplitude value and a relative 25 Hz component value. Because the tagging signal is 3 dB depth-modulated onto the pulsed RF carrier signal, as discussed above, the relative 25 Hz component should be approximately 0.17. It is noted however, that if the detected pulse peak amplitude had been generated by spurious signals and not by leakage signals, then the relative 25 Hz component would be substantially lower.

To carry out the above described functions, the tag extraction circuit 312 preferably includes an input buffer 328, a correlation block 330, a mean block 332, a division block 334 and a summation block 335. The input buffer 328 receives the digital pulse signal and provides that signal to the correlation block 330 and the mean block 332. The correlation block 330 then generates a measurement of the relative $f_{tag}$ component of the digital pulse signal. In this embodiment, the correlation block 330 generates a value equal to A*PP, where A is the relative $f_{tag}$ component and PP is the pulse peak component.

To this end, the correlation block 330 carries out the following equation using the appropriate digital signal processing functions:

$$PP*A = [(2/N)\Sigma\{P(n)\cos(2\pi f_{tag}Tn)\}]^2 + [(2/N)\Sigma\{P(n)\sin(2\pi f_{tag}Tn)\}]^2$$

where n is a sample index, P(n) is the nth digital pulse signal sample in one second, T is the pulse period, and N is the number of digital pulse signal samples in one second.

Contemporaneously, the input buffer 328 also provides the digital pulse signal to the mean block 332. The mean block 332 generates the mean over N digital pulse signal samples. It can be shown that the resulting mean block output value is equal to the PP*(1−A). The division node 334 then divides the correlation block output value by the mean block output value in order to factor out the PP value from the correlation block output value. The resulting value, which is referred to as the $f_{tag}$ measurement value, is A/(1−A).

The summation node 335 receives and sums the mean block output value with the correlation block output value. The resulting value is PP*A+PP*(1−A), or simply, PP. The value PP is the measured pulse peak amplitude. The pulse peak amplitude is a measure of the power or signal strength detected at 332.2625 MHz, regardless of whether that signal strength was attributable to the pulsed RF tagging signal.

The output circuit 314 then receives the $f_{tag}$ measurement value and the pulse peak amplitude from the tag extraction circuit 312 and generates either a visible and/or audible indication therefrom. For example, the output circuit 314 may include a visible display that displays information indicative of the pulse peak amplitude and another indicator, either audible or visible, that communicates whether the tagging signal was detected.

To this end, the output circuit 314 may suitably include a threshold block 336 and an audible or visible indication circuit 338. The threshold block 336 receives the $f_{tag}$ measurement value from the division node 334 and determines whether the $f_{tag}$ measurement value is within a certain range that is consistent with the depth modulation of the tagging signal as generated by the tagging signal arrangement 20 of FIG. 1. In the example described herein, wherein the tagging signal is 3 dB depth-modulated, the threshold block determines whether the $f_{tag}$ measurement value is within a predetermined range of 0.17, such as, for example from 0.08 to 0.26. If so, then the threshold block 336 determines that the detected signal energy, as represented by the pulse peak amplitude, is attributable to the pulsed RF tagging signal, and provides an indicator signal to the indication circuit 338. If not, then the threshold block 336 determines that pulse peak amplitude is not attributable to the pulsed RF tagging signal and does not provide the indication signal to the indication circuit 338.

In either event, the indication circuit 338 receives the pulse peak amplitude value from the summation node 335 and provides a visible display indicative thereof. In addition, the indication circuit 338 provides another visible display and/or an audible display responsive to the indication signal received from the threshold block 336.

As a result, the technician is provided a display that shows a measurement of the pulse peak amplitude, which in turn is indicative of the signal level energy detected in the frequency band around 132.2625 MHz, and an indication of whether that signal level energy is attributable to the pulsed RF tagging signal generated by the tag insertion arrangement 20 within the transmission subsystem 12.

The leakage detector 300 thus provides a means by which leakage signals which have been tagged in accordance with the present invention may be detected. Spurious signals from other cable systems are distinguished such that the leakage detection is truly directed toward leakage from the system under test.

Figure 6:
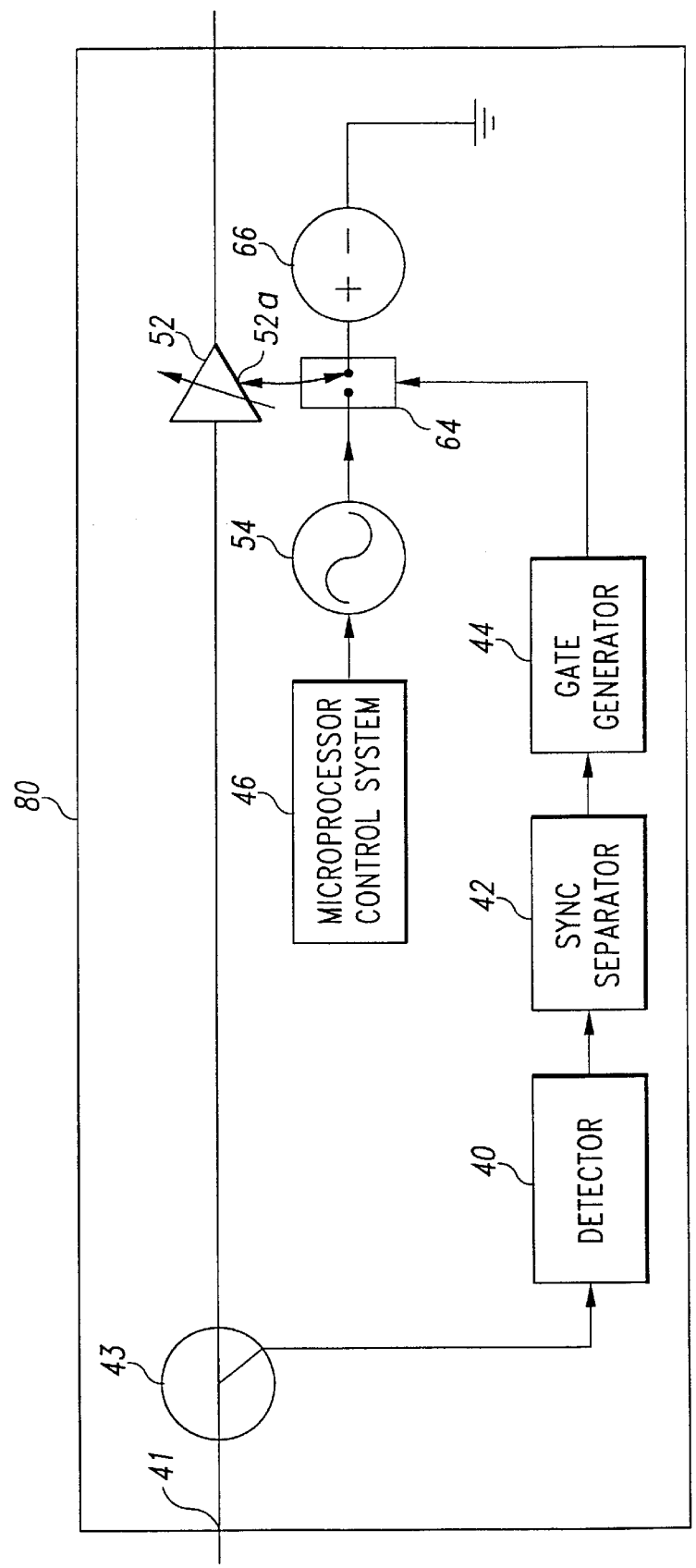
FIG. 6 shows an alternative tag insertion arrangement according to the present invention.

FIG. 6 shows an alternative embodiment of the tag insertion arrangement which may be used in the CATV system 10 of FIG. 1. In this embodiment, the tagging signal is inserted into the television signal by direct amplitude modulation of the first television signal with the tagging signal. The tag insertion arrangement 80 of FIG. 6 is similar in structure to the tag insertion arrangement 20 of FIG. 2, and devices common to both devices will have the same reference numbers.

The tag insertion arrangement 80 comprises a detector 40, a television signal input 41, a synchronization circuit 42, a splitter 43, a gate generator 44, a low frequency tagging signal generator 54, a tag inserter comprising a VGA 52, a DC reference 66 and a two-way switch 64. The television signal input 41 is connected to the splitter 43 and the splitter 43, is further connected to the detector 40. The splitter 43 is also directly connected to the VGA 52.

The detector 40 is connected to the synchronization circuit 42, which in turn is connected to the gate generator 44. The detector 40, the synchronization circuit 42 and the gate generator 44 all have the same structure and operation as that described above in connection with FIG. 2. Analogous to the embodiment of FIG. 2, the gate generator 44 is connected to a control input of the two-way switch 64. In the present embodiment, the two-way switch 64 is a two-way analog switch connected to the control input 52a of the variable gain amplifier 52. The switch 64, under control of the gate generator 44, alternatively connects the control input 52a of the VGA 52 to either the low frequency tagging signal generator 54 or the DC reference voltage source 66.

In the operation of the alternative embodiment, the detector 40, the synchronizer 42 and the gate generator 44 operate as before to generate a gate signal pulse that is substantially synchronous with the vertical interval of the first television signal. The pulse causes the switch 64 to connect the low frequency tagging signal generator 54 to the control input 52a of the VGA 52. The low frequency tagging signal generator 54 then drives the VGA 52 with a low frequency oscillation, such as, for example a 25 Hz signal, thereby causing low frequency modulation of the first television signal.

When the pulse is not present, the switch 64 connects the DC reference voltage source 66 to the control input 52a. The DC reference voltage source 66 biases the VGA 52 such that the VGA 52 effectively does not change the first television signal. With such a configuration, the first television signal is modulated by the low frequency tagging signal only during the vertical interval.

It will be noted that the above described embodiments of the present invention are merely illustrative. Those of ordinary skill in the art may readily devise their own implementations that incorporate the principles of the present invention and fall within the spirit and scope thereof. In particular, it will be appreciated that the present invention may readily be implemented in television signals other than those having an NTSC standard format, such as for example PAL-formatted television signals. Moreover, the use of the vertical interval as the control information portion of the television signal is given by way of example only, and other periodic control information portions of a standard television signal, such as, for example, one or more quiet lines, or one or more horizontal sync pulses, may be employed. It is furthermore noted that specific frequencies, sampling rates, and the like may readily be altered by those of ordinary skill in the art to fit their particular implementation needs.

We claim:

1. A method of detecting leakage in a communication system, the communication system transmitting television signals comprising control information and program information, the method comprising:
   a) generating a tagging signal, said signal being detectable by corresponding leakage detecting equipment;
   b) identifying a portion of a television signal in which control information is present;
   c) inserting the tagging signal into the television signal only during the portion of the television signal in which control information is present.
   d) disposing the leakage detecting equipment in a location in which leakage is desired to be measured;
   e) indicating a presence of leakage on the communication system based on the detection of the inserted tagging signal.

2. The method of claim 1 wherein step c) further comprises modulating a carrier signal with the tagging signal only during the portion of the television signal in which control information is present and summing the carrier signal modulated with the tagging signal with the television signal.

3. The method of claim 1 wherein step c) further comprises modulating the television signal with the tagging signal only during the portion of the television signal in which control information is present.

4. The method of claim 1 wherein step a) further comprises generating an oscillating tagging signal.

5. The method of claim 2 wherein step c) further comprises modulating a carrier signal with the tagging signal, wherein the carrier signal has a frequency within the vestigial sideband associated with the television signal.

6. The method of claim 1 wherein the control information further comprises a vertical interval and step b) further comprises identifying a portion of a television signal in which the vertical interval is present, and step c) further comprises inserting the tagging signal into the television signal only during the portion of the television signal in which the vertical interval is present.

7. The method of claim 6 wherein step c) further comprises modulating a carrier signal with the tagging signal only during the portion of the television signal in which the vertical is present and summing the carrier signal modulated with the tagging signal with the television signal.

8. The method of claim 1 wherein step e) further comprises providing a visible indication responsive to the detection of the inserted tagging signal.

9. The method of claim 1 wherein step e) further comprises providing a visible indication of a measured signal energy level of the inserted tagging signal.

10. An arrangement for the insertion of a tagging signal into a television signal, the television signal comprising control information and program information, the television signal being transmitted by a communication system, the arrangement comprising:
   a) an input connected to a source of television signals comprising control information and program information;
   b) a tagging signal generator operable to generate a tagging signal that is detectable by corresponding leakage detecting equipment; and
   c) a signal inserter, coupled to the input and the tagging signal generator, operable to insert the tagging signal into the television signal;
   d) a switch operably coupled to the signal inserter to cause the signal inserter to insert the tagging signal only during the portion of the television signal in which control information is present.

11. The arrangement of claim 10 further comprises e) a detector coupled to the input, the detector operable to identify a portion of the television signal in which control information is present and wherein said detector provides a signal to the switch indicative of the presence of control information in the television signal.

12. The arrangement of claim 10 wherein said signal inserter comprises an amplitude modulator connected to the input, said amplitude modulator further comprising an RF output, and a control input connected to the switch.

13. The arrangement of claim 10 wherein the tagging signal generator is an oscillator.

14. The arrangement of claim 13 wherein the oscillator is operable to generate an oscillating signal having a frequency of less than 30 Hz.

15. The arrangement of claim 13 wherein the switch has a switching frequency, and wherein the oscillator is operable to generate an oscillating signal that has a frequency of less than one half of the switching frequency.

16. The arrangement of claim 10 wherein the control information further comprises a vertical interval and said switch is further operable to cause the signal inserter to insert the tagging signal into the television signal only during the portion of the television signal in which the vertical interval is present.

17. An arrangement for performing leakage detection in a communication system, the arrangement comprising:
   a) an input connected to a source of television signals comprising control information and program information;
   b) a tag insertion circuit operable to
      generate a tagging signal;
      identify a portion of a television signal in which control information is present; and
      insert the tagging signal into the television signal only during the portion of the television signal in which control information is present.
   c) a leakage detector operable to detect the tagging signal and generate an output responsive to detection of the tagging signal, the output indicative of a detection of leakage in the communication system.

18. The arrangement of claim 17 wherein the tag insertion circuit is further operable to modulate the television signal with the tagging signal only during the portion of the television signal in which control information is present.

19. The arrangement of claim 17 wherein the control information further comprises a vertical interval and the tag insertion circuit is further operable to
   identify a portion of a television signal in which the vertical interval is present, and
   insert the tagging signal into the television signal only during the portion of the television signal in which the vertical interval is present.

20. The arrangement of claim 17 wherein the leakage detector includes
   an RF receiving circuit operable to receive the television signal;
   a detection circuit operable to detect the presence of the inserted tagging signal in the television signal; and
   an indication circuit operable to indicate the detected presence of the inserted tagging signal.

21. The arrangement of claim 20 wherein the detection circuit includes an analog to digital converter and a digital detection circuit.

22. The arrangement of claim 20 wherein the indication circuit includes a visible display.

23. The arrangement of claim 21 wherein the digital detection circuit includes:
   a digital filter circuit operable to generate a filtered digital signal having pulses corresponding to the inserted tagging signal,
   a pulse extraction circuit operable to generate a digital pulse signal comprising pulse samples representative of the pulses of the filtered digital signal; and
   a tag signal extraction circuit operable to generate information representative of an amplitude of the inserted tagging signal based on the pulse samples.

* * * * *